Feb. 19, 1957 C. F. WEST ET AL 2,782,398

APPARATUS FOR PHOTOELECTRICALLY CATALOGING DIGITAL DATA ON MAGNETIC TAPE

Filed Aug. 28, 1953 7 Sheets-Sheet 1

INVENTORS
CHARLES F. WEST
JOHN E. DeTURK
JOHN H. MacNEILL
BY Elmer J. Gorn
ATTORNEY Feb. 19, 1957 C. F. WEST ET AL 2,782,398

APPARATUS FOR PHOTOELECTRICALLY CATALOGING DIGITAL DATA ON MAGNETIC TAPE

Filed Aug. 28, 1953 7 Sheets-Sheet 2

INVENTORS
CHARLES F. WEST
JOHN E. DETURK
JOHN H. MACNEILL

BY Elmer J. Gorn
ATTORNEY

INVENTORS
CHARLES F. WEST
JOHN E. DETURK
JOHN H. MACNEILL
BY Elmer J. Gorn
ATTORNEY

HUNT REGISTER 71

INVENTORS
CHARLES F. WEST
JOHN E. DeTURK
JOHN H. MacNEILL
BY Elmer J. Gorn
ATTORNEY

FIG. 9 HUNT CONTROL 75

INVENTORS
CHARLES F. WEST
JOHN E. DE TURK
JOHN H. MACNEILL
BY Elmer J. Gorn
ATTORNEY

APPARATUS FOR PHOTOELECTRICALLY CATALOGING DIGITAL DATA ON MAGNETIC TAPE

Filed Aug. 28, 1953 7 Sheets-Sheet 6

INVENTORS
CHARLES F. WEST
JOHN E. DeTURK
JOHN H. MacNEILL
BY Elmer J. Gorn
ATTORNEY Feb. 19, 1957 C. F. WEST ET AL 2,782,398

APPARATUS FOR PHOTOELECTRICALLY CATALOGING DIGITAL DATA ON MAGNETIC TAPE

Filed Aug. 28, 1953 7 Sheets-Sheet 7

INVENTORS
CHARLES F. WEST
JOHN E. DeTURK
JOHN H. MACNEILL
BY Elmer J. Gorn
ATTORNEY United States Patent Office 2,782,398

Patented Feb. 19, 1957

2,782,398

APPARATUS FOR PHOTOELECTRICALLY CATALOGING DIGITAL DATA ON MAGNETIC TAPE

Charles F. West, Melbourne, Fla., John E. De Turk, Ann Arbor, Mich., and John H. MacNeill, Melbourne, Fla., assignors to Raytheon Manufacturing Company, Newton, Mass., a corporation of Delaware Application August 28, 1953, Serial No. 377,219

9 Claims. (Cl. 340—174)

This invention relates to visible marks on magnetic tape having digital data recorded thereon and apparatus for utilizing said visible marks to locate a particular region on the tape.

In digital computers, it is convenient to store digital data in binary form on magnetic tape or other recording mediums. Such information is usually stored in blocks or in "words" made up of the presence or absence of a pulse in successive spaces. In order to find and sense a particular "word" when it is required in a computation, some means must be provided for identifying the desired "word," locating it on the tape, and positioning that portion of the tape where it can be read by the reading head or where new material can be written into that portion of the tape. One means for locating a block is to count blocks from the beginning of the tape until the desired block is reached. Even when magnetically-recorded block markers are used to identify the block, the "word" within an individual block cannot be altered without recording the complete tape and, in addition, since particular regions of a tape are not precisely and visibly marked off, the entire length of the tape must be free of blemishes, such as splices and pin holes, in order to be sure that no blemish interferes with the pickup of the data.

In apparatus for this purpose, constructed according to the applicants' invention, the blocks are identified by permanently printing appropriate visible block markers onto the magnetic tape. In a representative system of this type, bars are placed on one-half of the tape to represent 1's and on the other half to represent 0's. In the binary representation of the block number, the beginning and end of a block is indicated by the presence of marks on both sides of the tape at a particular position. These marks are sensed by two photoelectric tubes or cells, one on each side of the tape, so that a mark appearing within the field of scan of the photoelectric sensing device produces an electric pulse. A coincidence circuit is provided by which a pulse is produced when a mark appears on both sides of the tape at once. This pulse initiates the comparison cycle in which the desired block number stored in a shift register is compared digit-by-digit, preferably the digit of the highest order first, with the pulses produced by photoelectrically sensing the block markers following a set of double marks. When the same digit is sensed in the block being scanned and in the block number in the register, the scanning proceeds digit-by-digit until either a disagreement appears between the conditions in the block and the register at a particular position, or until the entire block number is checked and a second double mark is reached. When this occurs, a pulse is produced that controls the tape drive and magnetic reading and writing heads, either to perform the desired function utilizing the data recorded in the scan block or to reverse the operation of the tape drive to find the desired block.

The marks indicating the block number appear in such sequence that, when a complete block number has been scanned and found to agree with the desired block number in the register, the tape and reading head are in the proper relative position for the magnetically-recorded information on the block to be read and utilized in any desired way.

The visible marks are arranged so that, when the tape is traveling in the forward direction, the scanned tape block numbers increase in amplitude; when the tape is traveling in the reverse direction, the scanned block numbers decrease in magnitude. The opposite arrangement can be used, of course, but the invention will be described with reference to this arrangement of the block numbers. There are two of these numbers in a block. One is used for forward scanning and the other for reverse scanning. The blocks are separated by dead spaces bounded by start-stop markers. The second number reached in scanning a block is ignored. When the unit is hunting, the tape moves in the reverse direction to present the highest order of the block numbers first. The desired number in the register is shifted after each position in a block is scanned to present successively lower order digits for comparison with the scanned digits of the block numbers. If a 0 is detected when a 1 is required, the tape drive is stopped and the tape is moved in the forward direction, as this condition indicates that the scan block number is lower than the desired number and that the desired block will be found behind the block that is being scanned. However, an instruction to reverse the motion of the tape, after the highest digit of the block has been scanned, will result in stopping the operation and indicating that an error has occurred.

The manner in which these operations are performed by the apparatus embodying the invention will be best understood with reference to the drawings in which.

Figure 1:
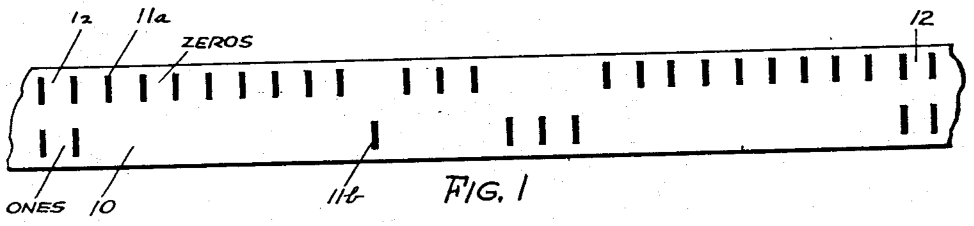
Fig. 1 is a plan view of the section of the tape scanned by the apparatus of the invention and shows the visible markings.

In Fig. 1, the reference numeral 10 designates a magnetic tape employed in a representative magnetic tape drive mechanism that is used in a preferred embodiment of the invention. This tape normally has a glossy surface. Thus, even though the magnetic tape is opaque (usually a medium brown), there is enough reflection from the shiny surface of the tape to cause a large percentage of incident light to be reflected without angular dispersion. However, when visible markings of whatever color are imposed on this glossy surface, the nature of the surface of the tape under these conditions is such that light from a source at right angles to the plane of the tape is greatly dispersed, causing less light to fall on a photoelectric cell mounted to one side of the light source and shielded from it. In Fig. 1, such markings are designated, generally, by the numeral 11.

It will be noted that these markings are arranged in two parallel longitudinal rows. As shown, the marks 11a in the upper longitudinal row represent the 0's, and the marks 11b in the lower row represent the 1's in a binary representation of the block numbers. As stated above, the presence of a mark in both rows at a given position represents a start marker if they occur at the beginning of a block and a stop marker if they occur at the end of a block. Such start-stop markers are shown at the ends of the section of tape shown in Fig. 1. The spaces 12 between two adjacent sets of start-stop markers are dead spots containing no magnetically-recorded information. Such spaces may be located so as to bracket any defective portions of the tape or splices between two sections of the tape. In Fig. 1, the first group of twelve marker positions, to the right of the start-stop markers on the left of the section of tape shown, represents the numeral 8. The second group of twelve marker positions represents the numeral 7.

Figure 2:
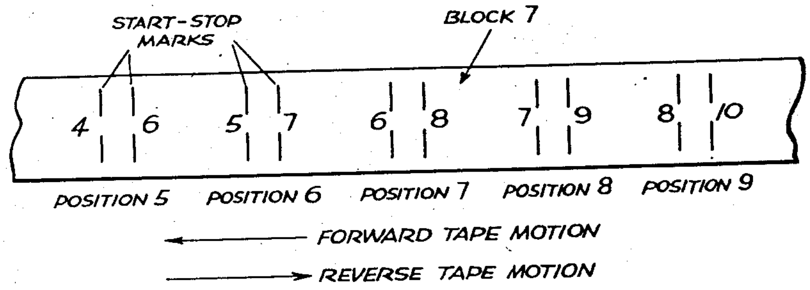
Fig. 2 is a plan view of a larger section of the tape of Fig. 1 showing schematically the arrangement of the blocks and positions.

Fig. 2 shows a larger section of a similar tape showing the location of the various blocks and the start-stop markers setting off these blocks. The block numbers themselves are not shown but are indicated by numerals. It will be seen that a 4 is represented in the first block to the left of the first set of start-stop markers. A 6 and a 5, in that order, are represented in the block to the right of this first set of start-stop markers, a 7 and a 6 appear in the next block, an 8 and a 7 in the next, a 9 and an 8 in the next, and a 10 in the last block on the right, shown in the section of the tape in Fig. 2. It will be also seen that the space between the start-stop markers separating block numbers 4 and 6 is designated as position 5. This means that, when the tape handling mechanism is about to read or write in the fifth block, the tape will be stopped with the sensing head over this dead space. Similarly, position 6 lies between the markers representing blocks 5 and 7. Position 7 lies between the markers representing blocks 6 and 8, and successive positions lie between the markers representing block numbers 1 above and 1 below the position number. The reason for this is that, as the tape proceeds past the photoelectric sensing heads in the reverse direction seeking block 7, should it first present position 9 to the photoelectric sensing head, the start markers will start the comparison process with the first block number encountered which will be an 8. As 8 is greater than the desired block 7, the tape will continue past the photoelectric sensing head and ignore the next set of stop markers. It will also ignore the second set of 12 markers within a block and proceed to sense the first set of twelve markers encountered in each block until a 7 is sensed. Then the tape is stopped by the next set of stop markers in position 7. There it remains until an indication is received that the rest of the equipment is ready to receive the information magnetically stored in the corresponding section of the magnetic tape or to write into that section of the tape new information.

Figure 3:
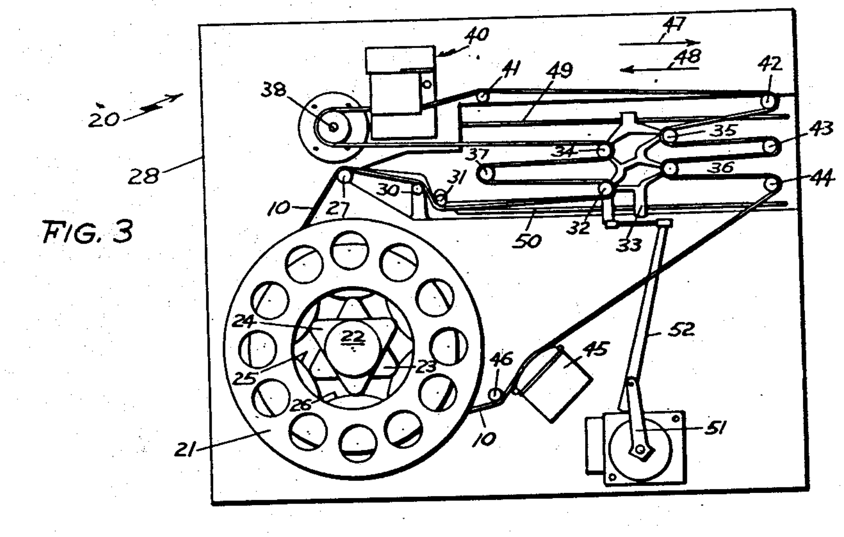
Fig. 3 is a plan view of the tape driving mechanism used with the invention.

The tape drive mechanism is shown, generally, in Fig. 3 and designated as a whole by the numeral 20. It may be of the type more fully described in the copending application of United States patent of De Turk and MacNeill (two of the applicants herein), Serial No. 175,401, filed July 22, 1950, now Patent No. 2,656,129, dated October 20, 1953. The tape 10 is wound on a take-off spool mounted directly below a pickup spool 21 of concentric shafts, only the inner 22 of which is shown. Both spools are attached to their respective shafts by triangular cam holders 23 and 24 engaging sets of rounded surfaces 25 and 26 formed on the inside of the spools and driven by motors (not shown). The tape coming off the take-off spool passes over an idler pulley 27 mounted on the main frame 28 and a pair of idler pulleys 30 and 31 set on an angle on the main frame 28 and over an idler 32 mounted on an auxiliary frame 33 carrying three other idler pulleys 34, 35, and 36. The tape is then passed over another idler 37 mounted on the main frame 28, and, after passing around an idler 34, passes around the motor-driven capstan 38 and through a sensing subassembly 40, the photosensing part of which is shown in more detail in Figs. 4 and 5. On emerging from the sensing head 40, the tape passes about idlers 41 and 42 mounted on the main frame 28 and about an idler 35 mounted on the auxiliary frame 33, and alternately about idlers 43, 36, and 44, idlers 43 and 44 being mounted on the main frame, then past a wiper head 45 and about an idler 46 mounted on the main frame 28 back to the takeup spool 21. The auxiliary frame 33 is free to move left and right, as shown by the arrows 47 and 48 on rods 49 and 50. This motion of the auxiliary frame 33 is translated into rotary motion of a potentiometer 51 by the linkage 52. This potentiometer 51 is connected in the circuit of the motors driving the tape reels in a manner to maintain the tension on the tape substantially constant and within the limits of the tensile strength of the tape 10. This circuit is described in the cited application.

Figure 4:
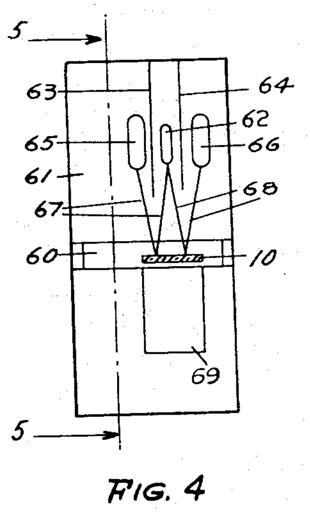
Fig. 4 is an enlarged view of the photoelectric sensing head of the tape driving mechanism of Fig. 3 taken along the line 4—4 of Fig. 5.
Figure 5:
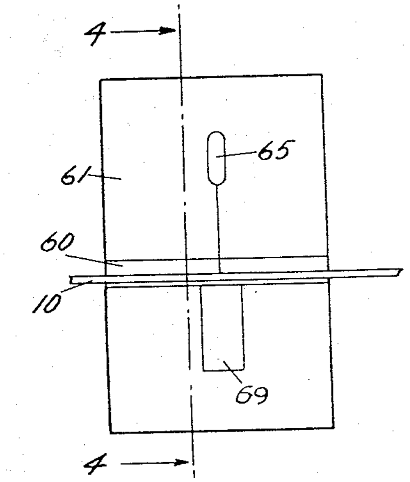
Fig. 5 is a section taken along the line 5—5 of Fig. 4.

The sensing head 40 is shown more in detail in Figs. 4 and 5. It will be seen that the tape 10 passes through a slit 60 in a case 61 containing a light source, such as the lamp 62 positioned between two baffle plates 63 and 64. The photoelectric devices 65 and 66 are mounted on either side of the baffles 63 and 64. These devices may be either photoelectric cells or tubes. In such positions they also receive light dispersively reflected from a mark 11 on their side of the tape 10 along the paths 67 and 68, respectively. The light falling on one of the photoelectric devices 65 or 66 produces an electric pulse in its output whenever a marker passes beneath it. The magnetic reading or writing head is located in the lower portion of the case 61.

Figure 6:
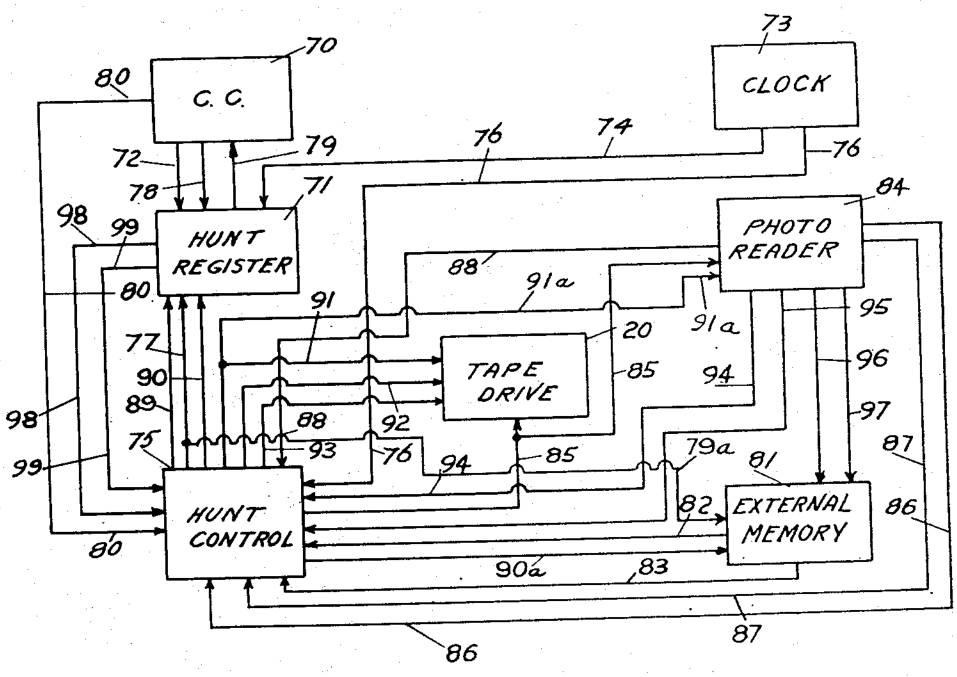
Fig. 6 is a general block diagram showing the division of the hunt system of the invention into its component sections.

Fig. 6 shows a general block diagram of the circuit used to cause the pulses produced by the photoelectric sensing units to control the tape mechanism. In this circuit, a central control section 70 sends the desired block number to a hunt register 71 over a line 72. A train of pulses at a 4-megacycle repetition rate originates in a clock pulse generator 73 and is applied to the hunt register 71 over a line 74. One of these pulses, in a representative circuit the twentieth such pulse, is selected in the clock 73 and connected to a hunt control section 75 over a line 76 where a pulse is derived that is connected to the hunt register 71 over a line 77. A pulse is obtained from the central control section 70 and applied to the hunt register 71 over a line 78. A hunt operate sequence pulse is produced in the hunt register 71 and connected to the central control section 70 over a line 79. A hunt command pulse is sent from the central control section 70 to the hunt control section 75 over line 80. A stop marker pulse is obtained from an external memory 81 over a line 82 and applied to the hunt control section 75. A forward marker pulse is obtained from the external memory 81 over a line 83 and applied to the hunt control section 75. Positive potential for a relay in a photo reader section 84 and for one in the tape drive section 20 is obtained from the hunt control section 75 over a line 85. The outputs of the 1's and 0's photo heads are applied over the lines 86 and 87, respectively, to the hunt control section 75. A positive pulse generated in the photo reader 84 is applied to the hunt control section 75 over a line 88. A shift pulse is generated in the hunt control section 75 and applied to the hunt register 71 over line 89. A hunt operate pulse originates in the hunt control section 75 and is carried to the hunt register 71 over a line 90 and to the external memory 81 over a line 90a. Reverse, stop and forward pulses are generated in the hunt control section 75 and sent over lines 91, 92, and 93, respectively, to the tape drive section 20 to control its operations. The reverse signal is also sent to the photo reader 84 over a line 91a. A stop pulse originating in the photo reader 84 is connected over a line 94 to the hunt control section 75. A source of negative potential in the photo reader 84 is connected to the hunt control section 75 over line 95. Two start pulses also originating in the photo reader 84 are connected to the external memory 81 over lines 96 and 97, respectively.

The circuit, by which these operations are accomplished, is shown in the more detailed block diagrams of Figs. 7 through 11. The hunt argument, or the binary representation of the desired block number in the form of electrical pulses, is applied over line 72 from the central control section 70 to an electrical delay line of any of the well-known designs, shown in Fig. 8 as rectangles 100*a*, 100*b*, 100*c*, 100*d*, 100*e*, and 100*f*, each representing a section of this line. In the embodiment selected for illustration, the block number is considered as having 12 digits requiring 13 sections of delay line 100. However, to simplify the diagram only six are shown. Between delay line sections 100*c* and 100*d* there is a gate 101 with one input connected to a delay line 102 that is, in turn, connected over line 74 to a source of pulses having a four-megacycle or other convenient repetition rate in the clock 73. The gate 101 and other gates elsewhere in the drawings are denoted by a circle or semicircle enclosing a G with arrows representing the inputs and a line denoting the output. Preferably, these gates are pentodes with one input at the control grid and the other at the suppressor grid with the output taken from the plate. The delay line 100 is tapped between successive sections 100*a* and 100*b*, 100*b* and 100*c*, 100*c* and 100*d*, 100*d* and 100*e*, 100*e* and 100*f*, and after section 100*f*. These taps are each connected to one input of a drop-out gate 103. There is a multivibrator 104 associated with each gate 103 to complete a shift register for the desired block number, hereinafter called the hunt-argument register.

Each multivibrator throughout the block diagrams is represented by a rectangle with arrows to indicate the inputs. The set input is normally on the left and the reset input is normally on the right-hand side. Either small rectangles or triangles represent the outputs, the reset output being shown on the left-hand side and the set output on the right-hand side. When the opposite arrangement is used, the set input is indicated by an *s* and the reset input by an R. The set output is on the opposite side from the set input. The output of each gate 103 is coupled to the reset input of its associated multivibrator 104 through a rectifier 105. The output of each multivibrator 104 is applied to the reset input of the next highest order of multivibrator through a delay line 106 and a rectifier 107, except that the output of multivibrator 104*f* is applied to the reset input of multivibrator 104*a*.

The set input of each multivibrator 104 is connected to the output of the gate 108 through a transformer 110 represented by a diamond enclosing a T and a rectifier 111. One input to the gate 108 is obtained from the output of a gate 112 through a rectifier 113 and a transformer 114. One input of the gate 112 is connected to the central control section 70 over line 78. The other input is connected to the set output of a multivibrator 116. The set input of this multivibrator 116 is also connected to the central control section over line 78. The reset input of the multivibrator 116 is connected over line 77 to the cathode resistor 117 of a thyratron 118 in the hunt control section 75, that is also connected over line 77*a* to the external memory 81. The grid 120 of this thyratron is coupled through a capacitor 121 to a source of control pulses in the clock 73 over a line 76. The grid 120 of the thyratron 118 is also connected to a source 122 of negative potential through a resistor 123. The grid 120 is also connected to ground over normally-closed contacts 124 on relay 125. The plate 126 of the thyratron is connected to a source 127 of positive potential over normally-closed contacts 128 on the relay 125 through resistor 129. The output of the gate 112 is also connected to a delay line 130. A tap 131 on this delay line is connected to a second input of the gate 108 through a rectifier 132 and across a capacitor 133 connected to ground. The far end of the delay line 130 is connected to a second input of each of the gates 103 through a transformer 134.

Figure 7:
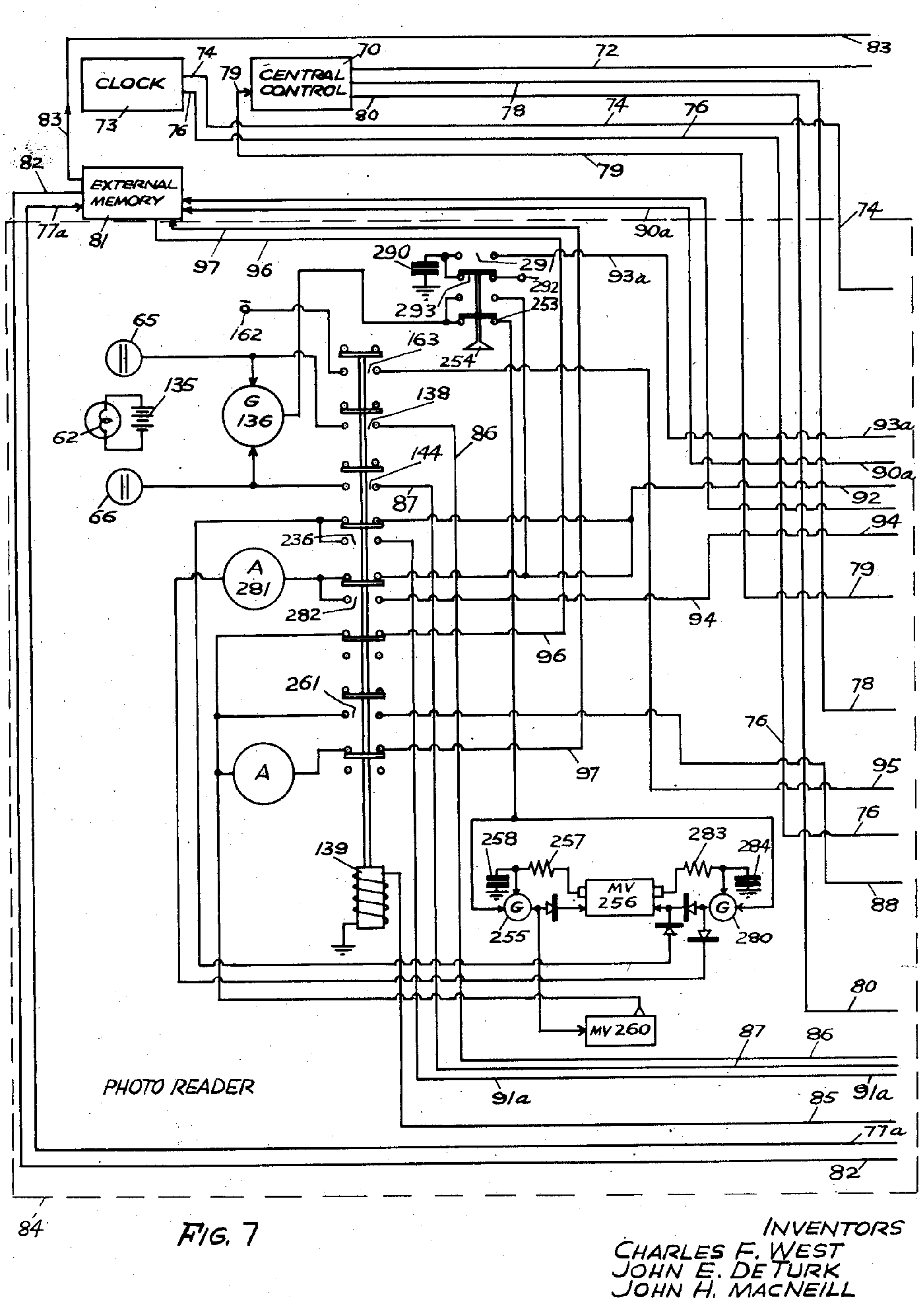
Figs. 7 through 11 are a more detailed block diagram of the circuit used with the equipment embodying the invention.
Figure 8:
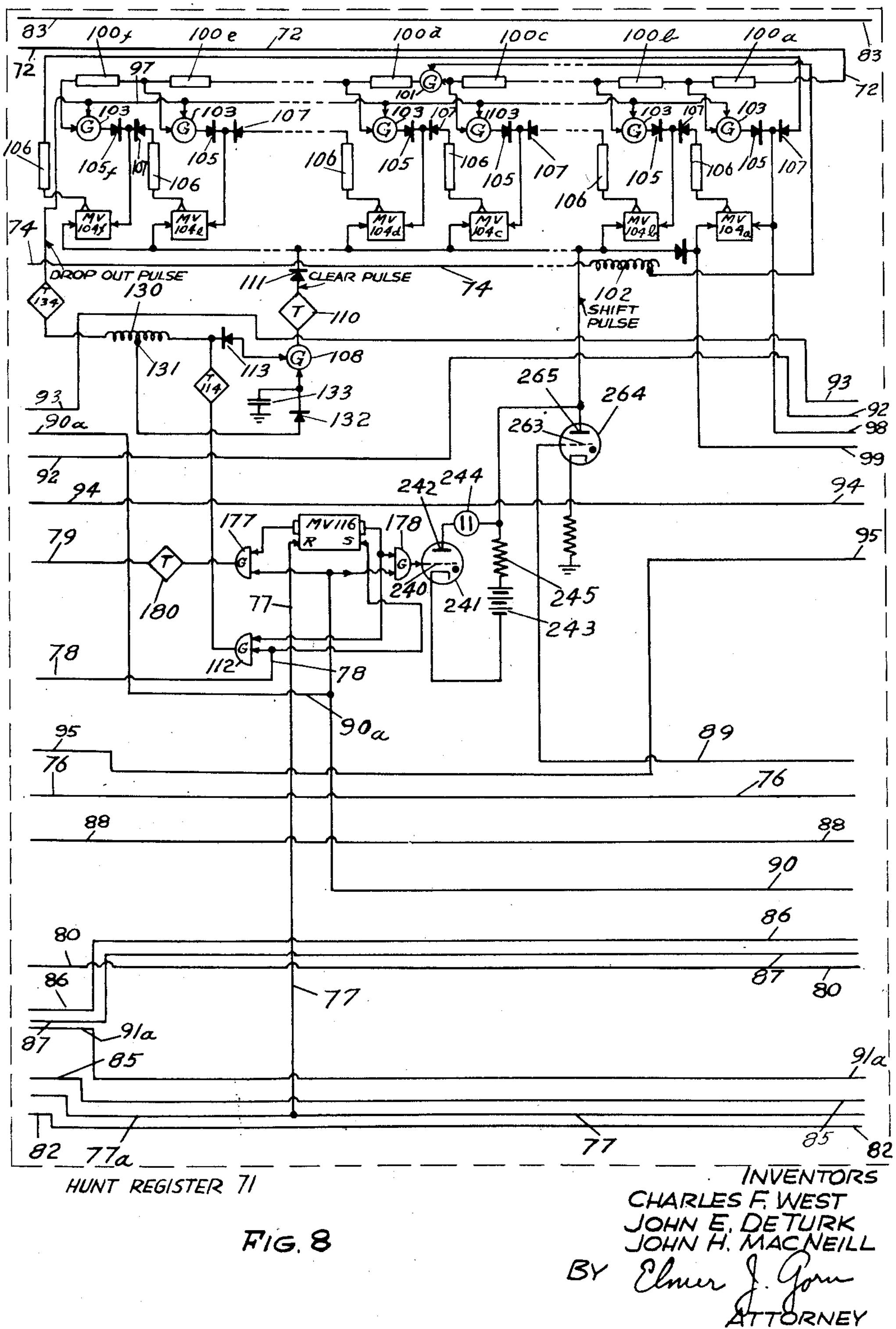
Figure 9:
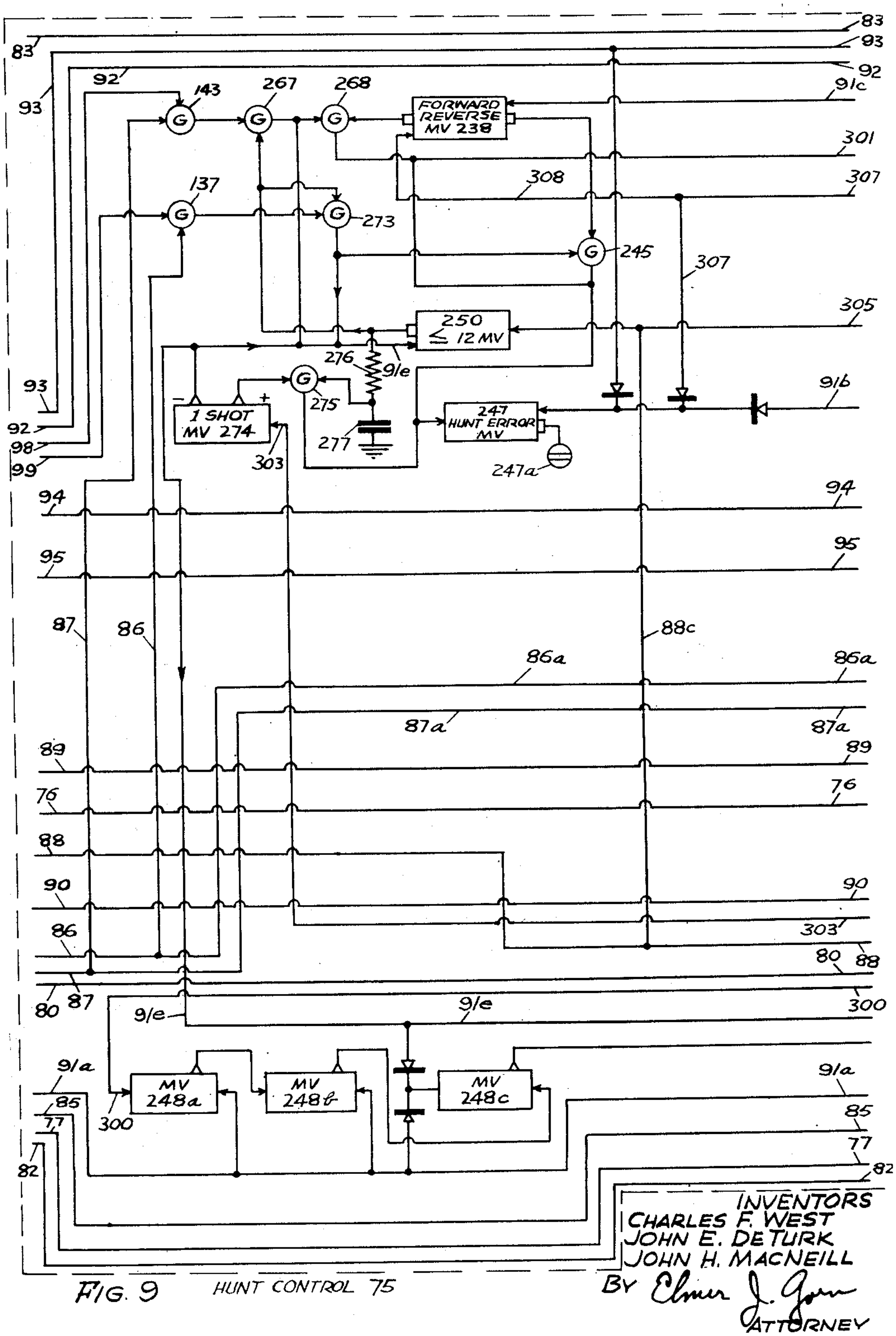
Figure 10:
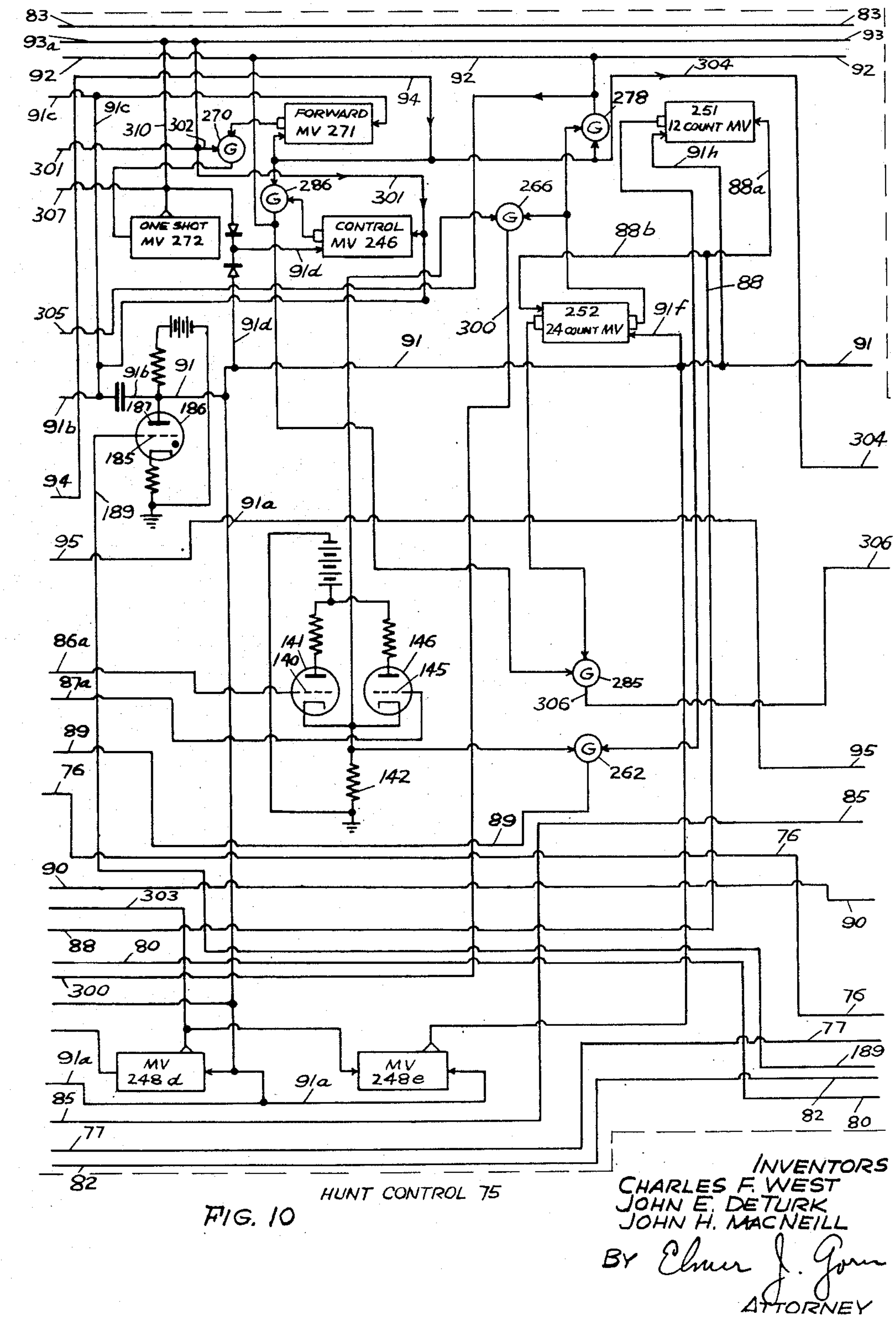

Photoelectric heads 65 and 66, shown in Figs. 4, 5, and 7, sense the presence of marks in the 1 and 0 tracks, respectively, of the tape 10. They are illuminated by a lamp 62 supplied with current by a source 135, shown as a battery. The outputs of the heads 65 and 66 are each connected to one input of the gate 136. The output of photoelectric sensing head 65 is also applied to an input of the gate 137 in the hunt control section 75 over line 86 and the normally-open contacts 138 on the relay 139 in the photo reader section 84 and to the grid 140 of a cathode follower 141 having a cathode resistor 142 over line 86*a*.

Similarly, the output of the photoelectric sensing head 66 is connected to an input of the gate 143 over normally-open contacts 144 on the relay 139 over line 87 and over line 87*a* to the grid 145 of the cathode follower 146 having the same cathode resistor 142 as the cathode follower 141.

The coil of the relay 139 is connected to a source of positive potential 147 in the hunt control section 76 over normally-open contacts 148 on a hunt-normal relay 150 over line 85. The coil of relay 150 is connected between a source 151 of positive potential and the plate of an amplifier 152, the grid of which is connected to the set output of a hunt multivibrator 153. The set input of this multivibrator 153 is connected to the output of a gate 154. One input of the gate 154 receives a hunt-command impulse from the central control section 70 over line 80. This impulse is also applied to an input of a gate 155. The second input of the gate 154 is connected to the reset output of the tape motion multivibrator 156. The second input of the gate 155 is connected to the set output of the multivibrator 156. The set input of the tape motion mutivibrator 156 is obtained as a forward signal from the external memory section 81 over line 82, and the reset input for this multivibrator is obtained as a stop impulse from the external memory over line 83. The output of the gate 155 is applied to the set input of a hunt-store multivibrator 157. The reset input for this multivibrator is also the stop impulse from the external memory. The output of the hunt-store multivibrator 157 is also applied to the set input of the hunt multivibrator 153.

The coil of another relay 158 in the tape drive section is also connected to a source 147 of positive potential over the normally-open contact 148 on the relay 150.

Figure 11:
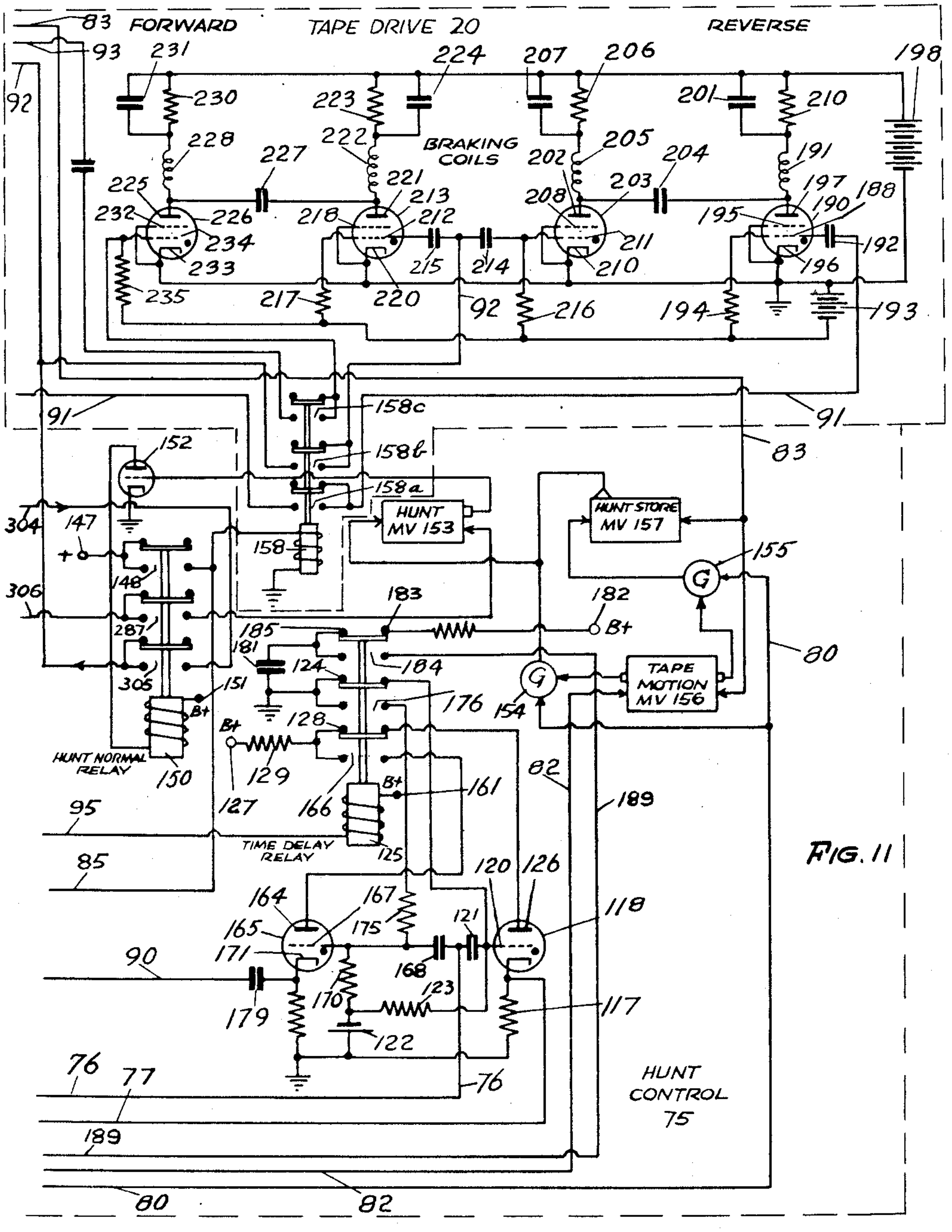
Figure 12:
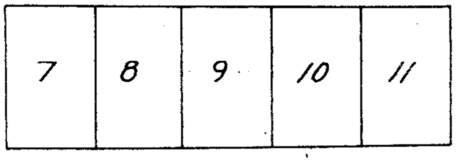
Fig. 12 is a diagram showing the arrangement of Figs. 7 through 11, in order to complete the connections of the circuit.

The circuit through the coil of the time delay relay 125 from the source 161 of positive potential in the hunt control section 75, shown in Fig. 11, to a source 162 of negative potential in the photo reader 84, shown in Fig. 7, is completed over line 95, and over the normally-open contacts 163 on the relay 139.

Positive potential from a source 127 is applied to the plate 164 of the thyratron 165 over the normally-open contact 166 on the relay 125. A positive control pulse is applied to a grid 167 of the thyratron 165 from the clock 73 over line 76 through capacitor 168. The grid 167 is also connected to a source 122 of negative potential through a resistor 170. It is also connected to ground through a resistor 175 and over normally-open contacts 176 on the relay 125. The cathode 171 is coupled to one input each of the gates 177 and 178 in the hunt register section 71 over line 90 through capacitor 179 and to the external memory 81 over line 90*a*. The other input to the gate 177 is connected to the set output of the multivibrator 116 and the other input of the gate 178 is connected to the reset output of the multivibrator 116. The output of the gate 177 is coupled through transformer 180 to the central control section 70 over line 79.

A capacitor 181, normally connected to a source 182 of positive potential over normally-closed contacts 183 on relay 125, is also connected over normally-open contacts 184 on this relay 125 to the grid 185 of a thyratron 186 over line 189. The plate 187 of the thyratron 186 is connected to the grid 188 of a thyratron 190 controlling the reverse clutch coil 191 in the tape drive section 20 over line 91 and normally-open contacts 158a on relay 158 and through a capacitor 192. The grid 188 is also connected to a source 193 of negative potential through a resistor 194. The screen grid 195 of this tube is connected to the cathode 196. The plate 197 is connected to a source 198 of positive potential through the coil 191 and a resistor 200 shunted by a capacitor 201. The plate 197 of the thyratron 190 is coupled to the plate 202 of a thyratron 203 through a capacitor 204. The plate 202 is also connected to the source 198 through one of the braking coils 205 of the tape drive mechanism 83 and a resistor 206 shunted by capacitor 207. The screen grid 208 of this tube 203 is connected to the cathode 210. The grid 211 is coupled to the first grid 212 of a thyratron 213 through capacitors 214 and 215 and to the source of negative potential 193 through a resistor 216. The grid 212 of the thyratron 213 is also connected to the source 193 through a resistor 217. The second grid 218 of this thyratron is connected to the cathode 220. The plate 221 is also connected to the source 198 of positive potential through a braking coil 222 and a resistor 223 shunted by a capacitor 224; it is also coupled to the plate 225 of a fourth thyratron 226 through a capacitor 227. The plate 225 of the thyratron 226 is also connected to the source 198 of positive potential through the forward clutch coil 228 and a resistor 230 shunted by a capacitor 231. The second grid 232 is connected to the cathode 233. The first grid 234 is connected to the source 193 of negative potential through a resistor 235.

The plate 187 of the thyratron 186 in the hunt control section 75 is also connected over lines 91 and 91a and the normally-open contacts 236 of the relay 139 to the reset input of a multivibrator 256 in the photo reader 84. The plate 187 of the thyratron 186 is also coupled over lines 91b and 91c to the reset input of the forward-reverse multivibrator 238.

The second input to the gate 178 is connected to the reset output of the multivibrator 116. The output of the gate 178 is connected to the grid 240 of a thyratron 241, the plate 242 of which is connected to a source 243 of positive potential through an indicator lamp 244 and a resistor 245.

The plate 187 of the thyratron 186 is also connected over lines 91 and 91d to the set input of the control multivibrator 246, to the reset input of the hunt-error multivibrator 247 over line 91b, to the reset input of the multivibrators 248a, 248b, 248d, and 248e and the set input of the multivibrator 248c over lines 91a and 91e. The multivibrators 248 comprise a 12 and 24-count register. The plate 187 of the thyratron 186 is also connected to the set input of the less-than-twelve multivibrator 250 over lines 91 and 91a, the set input of the twelve-count multivibrator 251 over lines 91 and 91h, and the set input of the twenty-four-count multivibrator 252 over lines 91 and 91f.

The output of the gate 136 in the photo reader 84 is connected over normally-closed contacts 253 on a push button switch 254 to one input of a gate 255, the other input of which is connected to the reset output of a multivibrator 256 through an integrating circuit comprising the resistor 257 and a capacitor 258. The output of the gate 255 is applied to the set input of the multivibrator 256 and to the input of a 1-shot multivibrator 260.

The output of the multivibrator 260 in the photo reader 84 is coupled to the reset input of the twelve-count multivibrator 251, to the set input of the twenty-four count multivibrator 252 and to the reset input of the less-than-twelve multivibrator 250 all in the hunt control section 75, over the normally-open contacts 261 on the relay 139 and the lines 88, 88b and 88c.

The cathode resistor 142 common to the cathode followers 140 and 146 is connected to one input of a gate 262, the other input of which is connected to the reset output of the twelve-count multivibrator 251. The output of gate 262 is connected over line 89 to the grid 263 of a thyratron 264 in the hunt register 71, the plate 265 of which is connected to the set input of each multivibrator 104. The cathode resistor 142 is also connected to one input of the gate 266, the other input of which is connected to the set output of the twenty-four count multivibrator 252. The output of the gate 266 is connected to the set input of the multivibrator 248a of the twenty-four count chain over line 300.

The reset input of the multivibrator 104a in the hunt register 71 is connected to the second input of the gate 143 in the hunt control section 75 over line 98. The set input of the multivibrator 104a is connected to one input to the gate 137 over line 99. The output of the gate 143 is connected to one input of the gate 267, the other input of which is connected to the reset output of the less-than-twelve multivibrator 250. The output of the gate 267 is connected to the set input of the multivibrator 250 and also to one input of the gate 268, the other input of which is connected to the reset output of the forward-reverse multivibrator 238. The output of the gate 268 is connected to the reset input of the control multivibrator 246 over line 301, to the set input of the hunt-error multivibrator 247 and to one input of the gate 270 over lines 301 and 302, the other input of which is connected to the reset input of the forward multivibrator 271. The output of the gate 270 is connected to the input of a one-shot multivibrator 272.

The output of the gate 137 is connected to one input of the gate 273, the other input of which is connected to the reset output of the less-than-twelve multivibrator 250. The output of the gate 273 is connected to the set input of the multivibrator 250 and to an input of the gate 245. The output of the multivibrator 248d of the 12 and 24-count chain, in addition to being connected to the set input of the multivibrator 248e, is connected to the input to a one-shot multivibrator 274 over line 303. The positive output of this multivibrator is connected to one input of a gate 275, the other input to which is connected to the reset output of the less-than-twelve multivibrator 250 through the integrating circuit comprising a resistor 276 and a capacitor 277. The negative output of the multivibrator 274 is connected to the set input of the twelve-count multivibrator 251 and to the set input of the less-than-twelve multivibrator 250, and also to the set input to the multivibrator 248c of the 12 and 24-count chain. The output of the multivibrator 248e of the 24-count chain is connected to the reset input of the 24-count multivibrator 252. The set output of the 24-count multivibrator 252 is connected to one input of a gate 278 in the hunt control section 75, the second input of which is connected to the output of a gate 280 in the photo reader 84 through an amplifier 281 and over normally-open contacts 282 on the relay 139 and line 94. The output of gate 280 is also connected over lines 94 and 304 and normally-open contacts 305 on relay 150 to the grids 211 and 212 of the thyratrons 203 and 213. One input of the gate 280 is connected to the output of the gate 136 over normally-closed contact 253 on the push button switch 254. The other input of the gate 280 is connected to the set output of the multivibrator 256 over the integrating circuit comprising resistor 283 and capacitor 284.

The output of the gate 278 is also connected to the grids 211 and 212 of the thyratrons 203 and 213 in the tape drive section 20 over normally-open contacts 158b on relay 158 and over a line 92. The output of this gate is also connected to the reset input to the multivibrator 250 over line 305. The reset output of the 24-count multivibrator 252 is connected to one input of the gate 285, the other input of which is connected to the output of a gate 286, one input of which comes from the reset output of the control multivibrator 246, the other input of which is connected to the output of the gate 280 in the photo reader section 84 over line 94 and normally-open contacts 282 of relay 139. The output of the gate 280 is also connected to the set input of the forward multivibrator 271 over normally-open contacts 282 on relay 139, through amplifier 281 and over line 94. The output of the gate 285 is connected to the reset input of the multivibrator 153 over line 306 and normally-open contacts 287 on the relay 150.

The output of the multivibrator 272 is connected to the reset input of the hunt-error multivibrator 247 over line 307, to the set input of the control multivibrator 246, to the set input of the forward-reverse multivibrator 238 over lines 307 and 308, and over lines 93 and 310 to the grid 234 of the thyratron 226 in the tape drive 20.

The grid 234 of the thyratron 236 is also connected to a capacitor 290 over normally-open contacts 291 on the push button switch 254 over lines 93 and 93*a*. The capacitor 290 is given a negative charge by being connected to a source 292 of negative potential over normally-closed contacts 293 on the push button switch 254.

In operation, the hunt-argument of the number of the desired block, in the form of a train of pulses with the higher orders occurring first, originates in the central control section 70 and is applied to the input to the delay line sections 100*a*, 100*b*, 100*c*, 100*d*, 100*e*, and 100*f* in the hunt-register section 71 over line 72. The insertion of pulses at a four-megacycle repetition rate from the clock unit 73 into the reshaping gate 101 through the section 102 of delay line, reshapes the pulses and assures accurate timing. The result is that, at an interval of time after the arrival of the argument equal to the total delay of all sections of the line, the pulse or absence of a pulse representative of each digit of the argument will be present at each tap on the delay line. The voltages appearing at these taps constitute one input to the associated gates 103*a*, 103*b*, 103*c*, 103*d*, 103*e*, or 103*f* ready to be transferred to the multivibrators 104 by the appearance of a drop-out pulse at the other input to each of the gates 103. This drop-out pulse originates as a control pulse in the clock 73 and reaches the hunt control section 75 over line 76. When this positive pulse appears at the grid 120 of the thyratron 118, it is effective to overcome the negative bias from the source 122 because the grid 120 is grounded over normally-closed contacts 124 on the relay 125 that has become de-energized by the successful completion of the previous hunt operation in a manner to be described later. The thyratron 118 is also receiving plate potential from the source 127 over normally-closed contacts 128 on the same relay.

The pulse developed at the cathode 117 of this thyratron is applied to the reset input of the multivibrator 116 to give a reset output pulse that is applied to one input of the gate 112. The other input of the gate 112 is obtained from the central control section over line 78 to produce a pulse at one input of gate 108. The appearance of the pulse from gate 112 produces a pulse in the output of gate 108 in the absence of a pulse at its other input. The output of gate 108 is applied to the set input of the multivibrators 104 and serves to clear them preparatory to the entry of a new count. The output of gate 112 is also applied to the input of a delay line 130. This pulse delayed by a short interval of time is taken off at the tap 131 and applied to the second input of the gate 108 through the rectifier 132 and across the capacitor 133 to inhibit the appearance of a pulse at the output of a gate 108, thus preventing the clearing of the register while the new number of the desired block is being dropped in through the gate 103 from the delay line 100. The output of the gate 112 after passage through the delay line 130, requiring three microseconds, becomes the drop-out pulse that is applied through transformer 134 to the inputs of all the drop-out gates 103 in the hunt argument register. Should the previous hunt operation not have been successfully completed, there will be no end of count pulses present at the reset input of the multivibrator 116, and the gate 112 will be inhibited by the set condition of the multivibrator 116.

The outputs of the photo sensing heads 65 and 66 are transferred from control of the memory to the control of the hunt control section. This transfer is accomplished by the completion of a circuit from a source 147 of positive potential over normally-open contacts 148 on the relay 150 now closed to the coil of the relay 139, thereby energizing it. The relay 150 has been previously energized by the completion of a circuit from the source 151 of positive potential through its coil and the plate cathode path of the amplifier 152. The amplifier 152 conducts when the multivibrator 153 is in the set condition. The set input for this multivibrator comes from the output of the gate 154 and also from the hunt-store multivibrator 157; one input of the gate 154 comprises a hunt command from the central control 70 applied over line 80. The other input comes from the reset output of the tape motion multivibrator 156, the reset input for which is the stop signal from the external memory 81 over line 83. If a forward signal has appeared at the set input of the tape motion multivibrator 156 over line 82 from the external memory 81, its set condition, together with the hunt command from the external memory, will cause gate 155 to produce a pulse that sets the hunt-store multivibrator 157 and inhibits a pulse at the set input of the hunt multivibrator 153 and until the hunt-store multivibrator 157 is reset by the appearance of a stop signal from the external memory at its reset input. Similarly, the coil of the relay 158 controlling the circuits to the clutch coils of the tape drive is energized over the same circuit as energized the relay 139.

With relay 139 energized, a circuit is completed from the 1's sensing photocell 65 over normally-open now closed contacts 138 on the relay 139 to the comparison circuits in the hunt control section. Similarly, a circuit is completed from the 0's sensing photocell 66 over normally-open now closed contacts 144 on relay 139 to the hunt control section. Meanwhile, if the hunt operation pulse has been preceded by a drop-in of the hunt-argument into the hunt-argument register, an impulse is sent to the central control section 70 over line 79. In order to do this, the time relay relay 125 is energized by completing a circuit from the source 161 of positive potential in the hunt control section through the coil of the relay 125 to a source 162 of negative potential in the photo reader over normally-open now closed contacts 163 on the relay 139 and line 95.

Upon the energization of the relay 125 after a time delay, a circuit is completed from a source 127 of positive potential over normally-open now closed contacts 166 on the relay 125 to the plate 164 of the thyratron 165. The grid 167 of this thyratron is normally maintained at cutoff potential by a negative potential applied from a source 122 through a resistor 170 but is now connected to ground over normally-open now closed contacts 176 on the relay 125 through a resistor 175. Thus the appearance of the control pulse 20 from the clock 75 over line 78 causes a pulse to appear at the cathode of the thyratron 165 which is differentiated and applied over the line 90 to one input each of the gates 177 and 178. The other input of these gates is the set and reset outputs of the multivibrator 116, respectively. When the multivibrator 116 is in a set condition, the gate 177 conducts and produces a hunt operation sequence pulse that is supplied to the central control section 70 over line 79.

When the time delay relay 125 is energized, it discharges the capacitor 181 over normally-open contacts 184 now closed to apply over line 189 a positive pulse to the grid 185 of the thyratron 186. This produces a negative pulse at the plate of the thyratron 186 that is applied over line 91a through normally-open now closed contacts 236 on relay 139 to the reset input of a multivibrator 256 and over line 91 and the contacts 156 on the relay 158 to the grid of the thyratron 190 that is associated with the reverse clutch coil 191 to start the tape drive in reverse. When the thyratron 190 conducts, it lowers the potential on its plate 197 and pulls the potential on plate 202 of the thyratron 203 down with it through the capacitor 204. Should the thyratron 203 be conducting, it will be cut off and no current will flow through its associated brake coil 205, permitting the tape 10 to move in the reverse direction.

If no drop-in pulse has occurred, the multivibrator 116 will remain in reset condition and gate 177 will remain closed. However, gate 178 will be open, producing a positive pulse that is applied at the grid 240 of the thyratron 241, causing it to fire and light a warning light 244 that is connected in its plate circuit.

The hunt-operate pulse from the thyratron 186 is also applied over normally-open now closed contacts 236 of the energized relay 139 and line 91a to the reset input of the multivibrator 256. This pulse is also applied to the reset input of the forward multivibrator 271 so that the reversal and subsequent forward motion of the tape can only be made to occur as a result of the first block comparison, as thereafter there can be no set output to create a forward pulse.

The output of the thyratron 186 is also applied to the set input of the control multivibrator 246 over line 91d to prevent the simultaneous occurrence of optical markers in both tracks of the tape from stopping the tape during hunting unless the correct block has been found or a tape reversal is indicated after the first block comparison, in a manner to be described later. The pulse from the thyratron 186 is also applied to the reset input of the forward-reverse multivibrator 238 over line 91c to set up a circuit that halts the machine and indicates an error at the end of the block in which a reversal of the tape motion is indicated if this block is not the first block to be compared.

The output of the thyratron 186 is also applied to the reset inputs of the multivibrators 248a, 248b, 248d, and 248e, and to the set input of the multivibrator 248c to set up the counter comprising multivibrators 248 to prevent further comparison of the hunt-argument and the block number after twelve block digits have been scanned. This counter also energizes a circuit that halts the machine and indicates error if a block containing less than twenty-four block digits has been scanned. The output of the thyratron 186 is also applied to the set input of the less-than-twelve multivibrator 250 to set up a circuit that allows the comparison to proceed if the number of the scanned digits is equal to, or greater than, twelve.

The output of this thyratron 186 is also applied to the set input of the twelve-count multivibrator 251 to set up the circuit that, after twelve-block digits have been scanned, halts the shifting of the hunt-argument in its register.

The output of the thyratron 186 is also applied to the reset input of the twenty-four-hunt multivibrator 252 to set up a circuit that, after twenty-four block digits have been scanned, prevents the stop markers from being counted and also checks to see if twenty-four block digits have been scanned before allowing the transmission of the end of hunt pulses.

The outputs of the photo sensing heads 65 and 66 are both applied to inputs of the gate 136 to produce a start marker pulse when marks are sensed simultaneously by both photocells. This pulse is applied over normally-closed contacts 253 on the push button switch 254 to one input of the gate 255, the other input of which comes from the reset output of the multivibrator 256 that has been reset by the operate pulse from the hunt control section. The output of the gate 255 sets the multivibrator 256 and triggers the one-shot multivibrator 260.

The output of the multivibrator 260 is applied over line 88 and normally-open now closed contacts 261 on the relay 139 in the photo reader 84 as the negative pulse to reset the twelve-count multivibrator 251, to set the twenty-four count multivibrator 252 and to reset the less-than-twelve multivibrator 250. The result is to open the comparison circuits after allowing for the maximum possible overlap of the optical markers by opening the circuit that compares the digits of the block number with the shifting digits of the hunt-argument, open the path for the pulse that shifts the digits of the hunt-argument, open the circuit that stops the machine if less than 24 block digits exist in the block being scanned by disabling the multivibrators that control these circuits.

The comparison routine proceeds by shifting the first or highest order digit in the hunt register multivibrator 104. The shift pulse is produced by applying the outputs of both optical channels over lines 86 and 87 to grids 140 and 145 of the cathode followers 141 and 146, respectively, to develop a positive pulse in the cathode resistor 142 when either optical channel delivers a pulse. The resulting pulse is applied to one input of the gate 262, the other input of which is the reset output of the twelve-count multivibrator 251. Thus, there will be an output from the gate 262 only if twelve pulses have not been counted. This pulse is applied to the set input of each of the multivibrators 104 in the hunt-argument register to shift the next order into the multivibrator 104a where the condition of this multivibrator produces a pulse in either the 0 or the 1 channel of the hunt-argument lines 98 and 99, depending upon whether an 0 or a 1 appears in the order of the block number present in the multivibrator 104a at that moment.

An output pulse from the ccathode follows 141 and 146 also produces an output from the gate 266 when the twenty-four count multivibrator 252 is in set condition. This will permit the passage of a pulse through the gate 266 as long as 24 positions have not been counted. The pulses passed through the gate 266 are applied over line 300 to the set input of the thyratron 248a of the twenty-four count chain to continue the count.

The digits compared may be equal or one may be greater than the other. If the same digit is indicated in a particular order in both the stored and sensed order, the comparison continues. If a mark shows up in the sensed 0 channel and a 1 is indicated in the hunt-argument register multivibrator 104a, the block number being sensed is lower than the desired number and the tape must be moved in the opposite or forward direction to reach the desired block. If a mark shows up in the sensed 1 channel and a 0 is indicated by the multivibrator 104a, the number sensed is too low and the tape can proceed to pass into the next block without further comparison and without the stop-start marks stopping the movement of the tape. When a 1 appears in the hunt-argument and a 0 in the block number digit sensed, pulses will appear at both inputs to the gate 143 and none at the inputs to the gate 137. The resulting output of the gate 143 produces an output from the gate 267 when the less-than-twelve count multivibrator 250 is in set condition and none if it is in reset condition, that is, if more than 12 pulse positions have been counted. The output of gate 267 sets the less-than-twelve multivibrator 250 and opens the gate 268 when the forward-reverse multivibrator 238 is in reset condition. The output from the gate 268 resets the control multivibrator 246, sets the hunt-error multivibrator 247, and serves as one input to the gate 270 that obtains its other input from this reset output of the forward multivibrator 271. In the presence of a pulse from this multivibrator, the gate 270 produces a pulse that triggers the 1-shot multivibrator 272, the output of which is applied to the grid 234 of a thyratron 226 over normally-closed contacts 158c on the tape drive control relay 158.

In the event that continued reverse motion is indicated by the presence of a 0 in the multivibrator 104a of the hunt-register, and a 1 in the optical channels, a pulse appears at both inputs of the gate 137 to produce an output that opens the gate 273 when the less-than-twelve multivibrator 250 is in the reset condition. The opening of the gate 273 sets the multivibrator 250.

If no pulse has been received at the reset input of the control multivibrator 246 when the gate 286 receives a stop pulse, the next stop marker will not stop the tape travel as this multivibrator will be in set condition inhibiting the gate 286.

As each digit is compared, a count is added to the twenty--four count chain of multivibrators 248. Another digit is shifted into the comparison stage of the hunt-argument register 104a and the comparison continues until either 12 marker positions have been counted, an error is detected, or a reversal of tape movement is indicated and effected in the manner described above. When twelve digits have been counted, a pulse appears at the output of the multivibrator 248d and is applied to the input to the 1-shot multivibrator 274, firing it. The resulting positive pulse opens the gate 275 when the less-than-twelve multivibrator 250 is in the reset condition. The negative output of the multivibrator 274 sets the less-than-twelve multivibrator 250 to prevent the opening of gate 275 and the setting of the hunt-error multivibrator 247. The negative pulse from the multivibrator 274 also sets the multivibrator 248c to permit the count to continue until it reaches 24. After the twenty-fourth digit has been counted, the output of the multivibrator 248e resets the 24-count multivibrator 252 to inhibit the gate 278 to prevent the passage of the next stop signal from the gate 280 in the photo reader. The resetting of the 24-count multivibrator 252 also inhibits the gate 266 to prevent the production of a pulse at its output when a shift pulse is received from the cathode followers 141 and 146.

A count of 24 digits may not be reached at the end of a block. When this happens, the tape should be stopped and an error indicated. To accomplish this a stop signal is produced at the output of the gate 136 by the appearance of a pulse in both optical channels. It is applied over normally-closed contacts 253 on the push button 254 to open the gate 280 when the multivibrator 256 is set. The gate 280 opens the gate 278 when the relay 139 is energized, and the 24-count multivibrator 252 is set as it has not as yet been reset by the completion of the 24-count, so that a pulse appears at the output of the gate 278 that sets the hunt-error multivibrator 247 and fires whichever of thyratrons 203 and 213 are not conducting to energize its associated coil 205 or 222. The conduction of either thyratron 203 or 213 will cause its associated thyratron 190 or 226 to be cut off owing to the drop in plate voltage at the plate 202 or 221 communicated either by way of capacitor 204 or 227.

As the twenty-four count multivibrator 252 is in set condition, there will be insufficient voltage at the reset output to permit the gate 283 to conduct, so that no end of hunt pulse will appear at the reset input of the hunt multivibrator 153 after passing over normally-open now closed contacts 285 on the hunt-normal relay 150.

In addition, if either forward motion or reversal is indicated by the comparison circuits, the output of gate 280 is also applied to the set input of the forward multivibrator 274 to prevent further tape reversal.

In addition, if an equality is indicated by the comparison circuits, the output of gate 280 opens gate 284 when the control multivibrator 246 is reset, to produce a stop pulse that fires the thyratrons 203 and 213 in the tape mechanism. Also, the end of hunt pulse from the output of gate 283 resets the hunt multivibrator 153 over a normally-open now closed set of contacts 285 on the hunt-normal relay 150. With the hunt multivibrator reset, the amplifier 152 no longer conducts and breaks the circuit for the coil of the relay 150, de-energizing it.

When forward motion is indicated by the comparison circuits, gate 270 conducts, applying a pulse to the 1-shot multivibrator 272, the output of which resets the hunt-error multivibrator 247 to extinguish the error-indicating lamp 247a. This pulse is also applied to set the control-multivibrator 246 and to set the forward-reverse multivibrator 238 and also fires the thyratron 226 that is associated with the forward coil 228 in the tape drive 20.

When the comparison circuits indicate equality and the hunt-normal relay 150 has been de-energized in the manner described above, the circuit energizing the relays 139 and 150 in the photo reader and the tape mechanism from the source 147 over normally-open contacts 148 is also opened to transfer control of the clutches to the external memory section 81.

When a second block is to be scanned and a forward motion has been indicated by the comparison circuits as a pulse at one input to the gate 267, and the less-than-twelve multivibrator 250 is reset, a pulse is produced that is applied to set the multivibrator 250 and stop further comparison. If the tape is already moving in the forward direction, the forward-reverse multivibrator 238 is in the set condition and prevents conduction through the gate 245 and the consequent resetting of the control multivibrator 246 which, in turn, prevents the stop marker from stopping the tape. However, if the tape is moving in the reverse direction, the output of the gate 267 opens the gate 268 when the forward-reverse multivibrator is reset, to produce a pulse that is applied to reset the control multivibrator 246 and to set the hunt-error multivibrator 247. When the multivibrator 246 is reset, it causes the gate 284 to pass a stop pulse to fire the thyratrons 203 and 213, controlling the stop clutch coils 205 and 222 in the tape drive section 20.

If reverse motion is indicated by the comparison circuits by the appearance of a pulse at the output of the gate 137, it opens the gate 273 when the less-than-twelve multivibrator 250 is reset to produce a pulse that is applied to the set input of this multivibrator to stop further comparison.

However, if the tape is already moving in the reverse direction, the output of the gate 273 is prevented from opening the gate 245 by the reset condition of the forward-reverse multivibrator 238, the set output of which is applied to the other input of the gate 245.

In the absence of any output from this gate to reset the control multivibrator 246, this multivibrator remains set and applies no pulse to the input of the gate 284, preventing the next stop marker from stopping the tape.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a data storage and selection system, a magnetic storage medium, means for storing data on said medium as a pattern of magnetized areas, visible marks indicating the location of particular portions of said data arranged in two longitudinal rows, one row representing 1's and the other representing 0's, photoelectric means for sensing the visible markings, means for storing a code number representative of a desired portion of the data, means for relative movement of the storage medium and the sensing means in both directions, means for comparing successive numerals of the visibly marked code and the stored code, and means under control of said photoelectric sensing means to change the relative positions of the storage medium and the sensing means until a desired position on the storage medium is reached.

2. In a data storage and selection system, a magnetic storage medium, means for storing data on said medium as a pattern of magnetized areas, visible marks indicating the location of particular portions of said data comprising two longitudinal rows of marks one row representing 1's and the other representing 0's, photoelectric means for sensing the visible markings, means for storing a code number representative of a desired portion of the data, means for relative movement of the storage medium and the sensing means in both directions, means for comprising successive numerals of the visibly marked code and the stored code, and means under control of said photoelectric sensing means to change the relative positions of the storage medium and the sensing means until a position on the storage medium is reached where there are marks in each row.

3. In a data storage and selection system, a magnetic storage medium, means for storing data on said medium as a pattern of magnetized areas, visible marks indicating the location of particular portions of said data arranged in two longitudinal rows, one row representing 1's and the other representing 0's, photoelectric means for sensing the visible markings, means for electronically storing a code number representative of a desired portion of the data, means for relative movement of the storage medium and the sensing means in both directions, means for comparing successive numerals of the visibly marked code and the stored code, and means under control of said photoelectric sensing means to change the relative position of the storage medium and the sensing means until a position on the storage medium is reached where all the visible codal marks and the stored code coincide.

4. In a data storage and selection system, a magnetic storage medium, means for storing data on said medium as a pattern of magnetized areas, visible marks on said medium indicating the location of particular portions of said magnetically-stored data arranged in two longitudinal rows, one row representing 1's and the other representing 0's, photoelectric means for sensing the visible markings, means for relative movement of the storage medium and the sensing means in both directions and means under control of said photoelectric sensing means to alter the relative position of the sensing means and the storage medium until the desired data is in position to be sensed by the magnetic sensing head comprising an electronic shift register for recording the desired block number in binary form and means for comparing the number stored in the shift register digit-by-digit with the photoelectrically sensed marks.

5. In a data storage and selection system, a magnetic storage medium, means for storing data on said medium as a pattern of magnetized areas, visible marks on said medium indicating the location of particular portions of said magnetically-stored data arranged in two longitudinal rows, one row representing 1's and the other representing 0's, photoelectric means for sensing the visible markings, means for storing a code number representative of a desired position of the data comprising an electronic shift register, means for relative movement of the storage medium and the sensing means in both directions, means for comprising successive numerals of the visibly marked code and the stored code, and means under control of said photoelectric sensing means for stopping said moving means when a mark is sensed in both rows of visible marks at once.

6. In a data storage and selection system, a magnetic storage medium, means for storing data on said medium as a pattern of magnetized areas, visible marks on said medium indicating the location of particular portions of said magnetically-stored data arranged in two longitudinal rows, one row representing 1's and the other representing 0's, photoelectric means for sensing the visible markings, means for storing a code number representative of a desired position of the data comprising an electronic shift register, means for relative movement of the storage medium and the sensing means in both directions, means for comparing successive numerals of the visibly marked code and the stored code, and means under control of said photoelecetric sensing means for stopping said moving means when a mark is sensed in both rows of visible marks at once, said means comprising a coincidence circuit operative when an impulse is obtained from both photosensing devices to stop the driving means.

7. In a data storage and selection system, a magnetic storage medium, means for storing data on said medium as a pattern of magnetized areas, visible marks indicating the location of particular portions of said data, photoelectric means for sensing the visible markings, means for relative movement of the storage medium and the sensing means in both directions and means under control of said photoelectric sensing means to alter the relative position of the sensing means and the storage medium until the desired data is positioned under the magnetic sensing means comprising a shift register comprising a sequence of elements each of which is in one or the other of two mutually exclusive states, means to set the elements in a pattern of states representative of the desired data in binary form and means for comparing the number represented successively by the highest order of the shift register with the photoelectrically sensed marks.

8. In a data storage and selection system, a magnetic storage medium, means for storing data on said medium as a pattern of magnetized areas, arranged in blocks, a pattern of visible marks indicating the location of a particular block of data and its number in binary notation, photoelectric means for sensing the visible markings, means for storing a code number representative of a desired position of the data comprising an electronic shift register, means to cause relative movement of the storage medium and the sensing means in both directions, means for comparing successive numerals of the visibly marked code and the stored code, and means under control of said photoelectric sensing means to change the relative positions of the storage medium and the sensing means until a predetermined position on the storage medium is reached.

9. In a data storage and selection system, a magnetic storage medium, means for storing data on said medium as a pattern of magnetized areas arranged in blocks, a pattern of visible marks indicating the location of a particular block of data and its number in binary notation, said patterns of visible marks being arranged in two parallel rows, one designating 1's and the other 0's and separated in blocks by two set marks appearing in both rows at the same position, the pattern of visible marks representing the particular block of magnetically-stored information being positioned in that portion of the block that will be sensed just prior to the arrival of the magnetic sensing heads at the desired block, photoelectric means for sensing the visible markings, means for storing a code number representative of a desired position of the data comprising an electronic shift register, means to cause relative movement of the storage medium and the sensing means in both directions, means for comparing successive numerals of the visibly marked code and the stored code, and means under control of said photoelectric sensing means to change the relative positions of the storage medium and the sensing means until a predetermined position on the storage medium is reached.

References Cited in the file of this patent

UNITED STATES PATENTS

| | | |
|---|---|---|
| 1,517,110 | Foley | Nov. 25, 1924 |
| 2,124,906 | Bryce | July 26, 1938 |
| 2,594,358 | Shaw | Apr. 29, 1952 |
| 2,616,626 | Lake et al. | Nov. 4, 1952 |
| 2,666,911 | Reynolds | Jan. 19, 1952 |
| 2,677,728 | Kolb et al. | May 4, 1954 |